Sept. 7, 1937.  F. A. ISAACSON  2,092,314
LIFTING STANCHION
Filed March 20, 1937  2 Sheets-Sheet 1
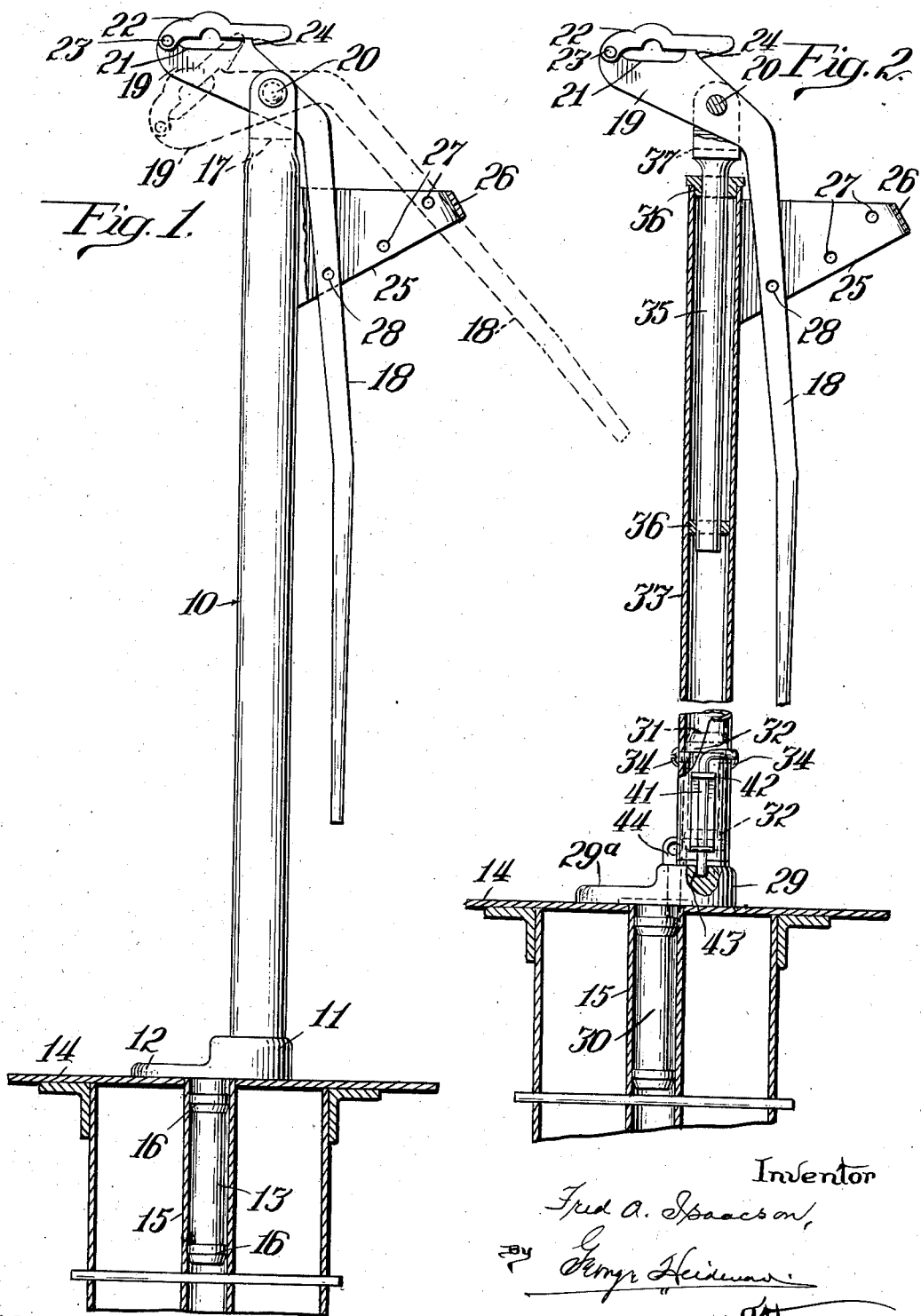
Inventor
Fred A. Isaacson,
By George Heidman
Attorney Sept. 7, 1937.  F. A. ISAACSON  2,092,314
LIFTING STANCHION
Filed March 20, 1937   2 Sheets-Sheet 2
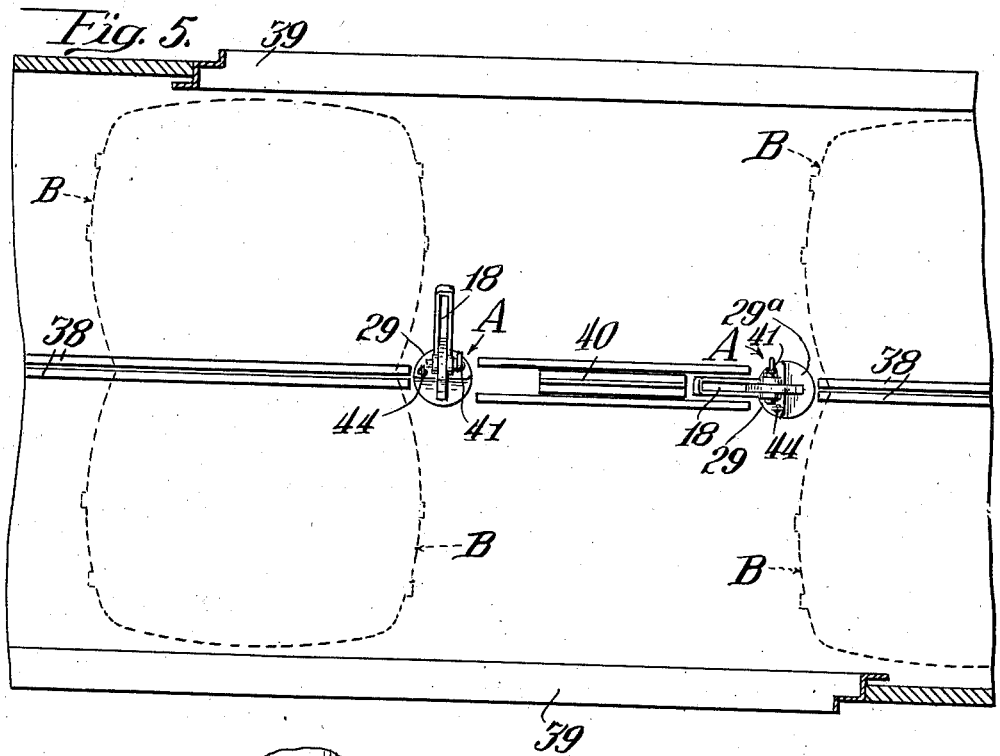
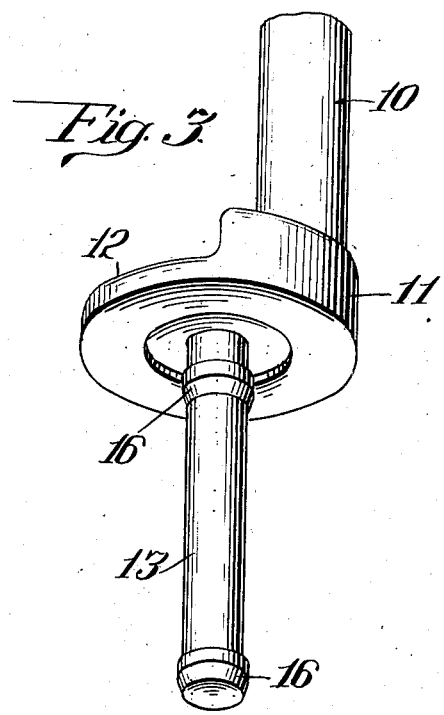
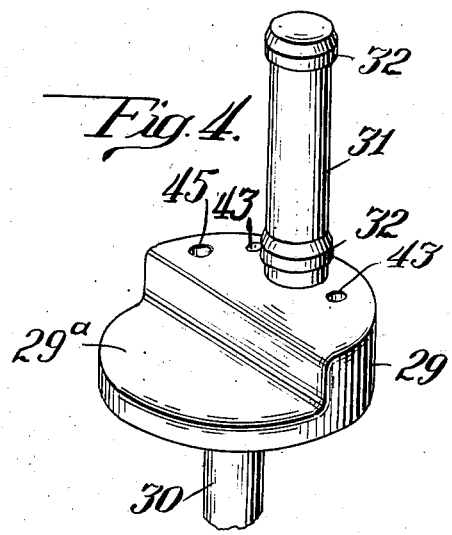
Inventor
Fred A. Isaacson,
By George Heidman
Attorney Patented Sept. 7, 1937

2,092,314

UNITED STATES PATENT OFFICE 2,092,314

LIFTING STANCHION

Fred A. Isaacson, Topeka, Kans.

Application March 20, 1937, Serial No. 132,057

7 Claims. (Cl. 105—368)

My invention relates to devices or stanchions for lifting and supporting heavy objects, as for example automobile bodies; the improved stanchion being particularly adapted for use in connection with the loading of automobile bodies in closed railroad freight cars in the manner described in my pending application Serial Number 103,686, filed Oct. 2, 1936, although my improved stanchion is adapted to other uses.
The invention has for its object the provision of sturdy lifting means of simple and comparatively inexpensive construction and of such nature that its operation may be easily performed and the method of automobile storage or arrangement in a compartment or in a freight car, for example, may be accomplished by a minimum number of workmen.

My improved stanchion is especially intended for use in connection with guideways or rails arranged on the floor of a chamber or freight car for guiding vertically arranged automobile body holding frames along a definite path and which afford stop or holding means whereby the up-ended automobile bodies or frames are held against movement transversely of the chamber or freight car.

The improved method of shipping automobile bodies—namely without motors and running gear—as defined by my aforementioned application contemplates guideways or rails to be arranged lengthwise on the railroad car floor with interrupted or cut away sections opposite the side doors of the car to permit the trucks on which the automobile body has been loaded to be trucked or wheeled transversely of the car floor. Where my improved stanchions are used in connection with the method of automobile body loading just mentioned, a pair of stanchions are mounted in the car floor in spaced relation sufficient to permit a body holding truck to be positioned between the two stanchions until the latter are operated and the automobile body lifted off the truck; the automobile body being pivotally supported to permit it to be up-ended into vertical position.
The objects and advantages of my invention will all be more readily comprehended from the detailed description of the accompanying drawings, wherein:

Figure 1 is a side elevation of my improved stanchion with the mounting for the lower end shown in section, while the lifting and lowering positions of the lift lever are shown in dotted lines and one wall of the lever guide bracket broken away.

Figure 2 is a sectional elevation of another form of my improved stanchion.

Figure 3 is a detail perspective view of the base portion of the stanchion shown in Figure 1, as viewed from the bottom.

Figure 4 is a perspective view of the base member of the type of stanchion shown in Figure 2.

Figure 5 is a diagrammatic plan view of the intermediate portion of a railroad car illustrating the use of my improved stanchions in connection with a method of loading automobile bodies on end.

In the particular exemplification of the invention disclosed in Figure 1, it comprises a stout upright or main body portion 10 of predetermined vertical length and cross-sectional contour provided at the lower end with an enlarged base and floor engaging portion 11, preferably substantially annular, with the main body portion 10 connected eccentrically with the base 11. The portion 12 of the base which extends away from the body portion 10 is preferably of less thickness so that the upper face of this portion will be disposed in a lower horizontal plane as shown in Figures 1 and 3 for a purpose hereinafter set forth.

The base 11 is centrally provided with a depending post 13 of predetermined length and adapted to extend through an opening in the floor 14 on which it is mounted. As my improved stanchion is more especially intended for use in connection with the method of shipping automobile bodies as hereinbefore mentioned, the car floor 14 is provided with an opening just sufficient for the insertion of the post 13 and the bottom of the floor is provided with a tubular housing 15 adapted to more or less snugly receive the post. In order to reduce frictional contact and also provide a lighter forging, the post 13 is preferably provided with the annular collars or flanges 16, 16. The housing 15 may be rigidly supported in any suitable manner in order to withstand any sidewise pressure of the post 13.

The upper end of the main body portion 10 is shown bifurcated at 17, to receive a suitable lift lever 18 therebetween. The lift or jacking lever 18 is of suitable length with its upper or head end 19 off-set or disposed to one side and pivotally secured between the bifurcations 17 by means of pin 20.

The upper surface or edge of the head portion 19 is preferably dished out or socketed as at 21 to receive a projection or trunnion providing portion on the object, automobile body or automobile body holding frame, whereby the object or body may be pivotally supported in place.

The head 19 of the lever is preferably provided with a latch plate 22 pivoted at 23 to one end of the head 19 so as to swing across the top of the head and over the projection or trunnion providing portion of the object to be lifted and thus prevent accidental slipping or movement of the projection out of the socket 21. Any suitable method for locking the free end of the latch plate 22 in latching position may be used; as for example by providing small interengaging projections or lips on the head and on the lower side of the latch plate as at 24, adapted to frictionally engage each other.

The main body portion 10, on the side coincident with lever 18, is provided with a bracket 25, preferably of U-shape cross-section so that lever 18 may pass therethrough; the closed end of the bracket disposed at the outer end of the bracket to provide a stop at 26 whereby too far upward swing of the lever is prevented.

The side walls of the bracket 25 are shown provided with spaced holes 27; and lever 18 is provided with a hole 28 adapted to register with holes 27 and to receive a suitable pin (not shown) whereby the lever 18 may be locked in the desired load holding position.

In Figure 2 I illustrate another form of my improved stanchion, namely a type especially intended for use in connection with the method of automobile body loading hereinbefore mentioned.

The stanchion of Figure 2 consists of an annular base portion 29 provided centrally with a depending post 30 which may be of construction similar to the depending post 13 of the stanchion shown in Figure 1.

This depending post 30 is also shown rotatably mounted in a housing 15 arranged beneath the car floor 14.

The base 29 on one side of the center is provided with an upstanding post 31, which is shown provided with annular shoulders 32, 32, adapted to engage the tubular upright 33 which telescopically fits the post 31 as shown. The tube 33 is of predetermined height and is adapted to fit onto post 31 so as to permit independent rotary movement of the tube 33; accidental removal of the tube 33 from the base being prevented by set-screws 34 which extend beneath the annular shoulder 32 at the upper end of the post 31, while permitting rotative movement of tube 33.

This tubular upright 33 at its upper end is provided with a fulcrum providing rod 35 of predetermined length and held in proper position by collars 36, 36, which may be welded or otherwise suitably secured to the rod; the collar 36 being flanged to also constitute a top piece for the tube. The upper exposed end of rod 35 is bifurcated at 37 to receive the upper end of lift lever 18 therebetween. The lift lever 18 is like lever 18 in Figure 1, with its head disposed to one side and pivotally secured between the bifurcations 37 by pin 20; the lever preferably extending through a bracket 25 as in Figure 1 in order that the end wall 26 of the bracket may limit the upswing of the lever.

In Figure 5 I have illustrated the adaptation of my improved stanchion to a method of loading automobile bodies in freight cars which latter have been provided along the longitudinal center line of the floor with suitable guide rails as at 38, 38 extending from points opposite the car side door openings, indicated at 39, to the ends of the car (not shown); while the space intermediate of these guide rails 38, 38 at the door openings is shown provided with a suitable stop rail or other means as at 40 for engaging the lower end of the automobile body frame after it has been lifted from the truck by the lifting stanchions and swung into vertical position. The stop rail or means 40 is suitably spaced from the ends of the guide rails 38, 38 to provide trucking space therebetween adapted to permit an automobile body and frame to be trucked transversely into the car through the door openings. At this space the car floor is shown provided with a pair of my improved stanchions indicated generally at A; these stanchions being spaced apart sufficiently to permit an automobile body to be disposed therebetween and to enable the head-ends of the lift levers 18 to engage a trunnion providing projection secured either to the body holding frames or to the automobile bodies themselves. The left hand stanchion in this figure is still in the position it would occupy for manipulating an automobile body which was intended to be placed on the side of the guide rails disposed toward the lower side of the figure; (the loaded automobile bodies being outlined in dotted lines at B); while the tubular upright 33 with its lift lever 18 of the stanchion at the right has been rotated on its base portion so as to arrange the lift lever 18 and its head in alignment with the guide rails which permitted the automobile body B at the lower right hand end of Figure 5 to be shifted toward the right beyond the stanchion.

The stanchions employed for the purpose illustrated in Figure 5 are preferably of the type illustrated in Figure 2 wherein the tubular upright 33 with its lift lever 18 may be rotated about the vertical axis of the upstanding post 31 of the base portion without rotating the base portion. The base portion 29, like base portion 11 in Figure 1, is provided with a reduced part or side 29ª and this reduced side of the base portion is shown toward the side of the guide rails where the automobile bodies are being shifted.

That is to say, the upper face of the reduced portion 29ª (like portion 12 in Figure 1) is intended to extend in substantially the same horizontal plane as the base portions of the guide rails so that the lower ends of the body holding frames may be shifted lengthwise of the car floor against the sides of the guide rails. Where the guide rails or means is of different type and substantially flush with the car floor it is apparent that the base 29 of the stanchion may be countersunk in the car floor sufficiently to bring the top surface of the reduced portion 29ª flush, or substantially so, with the floor.

After an automobile body has been lifted by the pair of stanchions and the body tilted into vertical position, the stanchion levers 18 are, of course, raised to lower the bottom end of the frames or bodies onto the floor or guide rails. The tubular uprights 33 and their levers 18 are then rotated about upstanding post 31 of the base so as to move the levers out of the path the body holding frame is to travel. Rotation of the upright 33 is permitted by the screws 34 which merely extend through tube 33 and engage beneath the collar 32.

In order to permit the tubular upright 33 to be rotated, the latch bolt 41, slidably mounted in the guide or bracket 42, is lifted or slid upwardly to disengage the lower end of the bolt 41 from a suitable hole 43 in the base 29; the bracket 42 being secured to the lower end of the tubular upright 33 as shown in Figure 2. The base 29 is preferably provided with a pair of holes 43 properly spaced so that the upright 33 with the lever may be held either in the operative position shown at the left in Figure 5 or in inoperative position shown to the right in Figure 5. In order that the base 29 of the stanchions may be held against accidental rotation, thereby shifting the eccentrically disposed upright out of adjusted positions, I prefer to provide a lock pin 44 which may pass through a hole 45 in the annular part of the base 29 or be slidably secured thereto so it may drop into a suitable hole in the car floor. This latch bolt or pin 44 must, of course, be raised out of the hole in the floor to permit rotation of the base 29 (which may be done by grasping lever 18, when upright 33 is locked to the base by bolt 41) so as to present the reduced side 29ᵃ of the base in the opposite direction from that shown in Figure 5 where the eccentrically mounted upright 33 and its lever will be disposed to the opposite side of the median line of the tracks 38, namely below the tracks 38 as viewed in Figure 5, thereby providing an uninterrupted path for movement of the automobile body or body holding frame lengthwise of the car floor.

As is apparent, the method of mounting the stanchions will permit the latter to be entirely lifted out of the floor sockets if occasion requires, without need of removing screws or bolts which in turn are apt to become loosened.

While my improved stanchions are especially adapted for use with the method of automobile loading herein mentioned and as described in my previously cited application, it is evident that the stanchions are equally adapted for lifting and tiltably supporting other commodities, whether in freight cars or elsewhere; and while the constructions illustrated are believed to be the best embodiments of my invention, modifications are possible and may be made without, however, departing from the spirit of my invention as defined by the appended claims.

What I claim is:

1. A lifting stanchion of the character described comprising a rotatably mounted base provided with an upright of predetermined height eccentrically arranged on the base, a lever pivotally secured to the upper end of said upright so as to oscillate through a vertically disposed arc, the pivoted end of the lever being provided with a head portion disposed toward the opposite side of the pivot, and means secured to the upright whereby the lever may be locked in a plurality of load supporting positions.

2. A lifting stanchion of the character described comprising a base provided with a centrally depending post on the bottom adapted to extend into an opening in a floor whereby the stanchion may be rotatably mounted, an upright eccentrically arranged on the top of the base; a lever pivotally secured to the upper end of the upright so as to oscillate vertically, the pivoted end of the lever being off-set to provide a head portion arranged on the opposite side of the pivot; and means secured to one side of the upright whereby the lever may be locked in a plurality of load supporting positions.

3. A lifting stanchion of the character described comprising an annular base provided with a centrally depending post on the bottom adapted to extend through an opening in a floor or mounting whereby the stanchion is rotatably mounted, an upright portion eccentrically arranged on the base; a lever pivotally secured to the upper end of the upright to oscillate vertically, the pivoted end of the lever being off-set to provide a head portion disposed toward the opposite side of the pivot, the top of the head being provided with a holding surface; and means secured to one side of the upright adjacent the upper end adapted to provide a stop for the upward swing of the lever and to permit the lever to be locked in a plurality of load supporting positions.

4. A lifting stanchion of the character described comprising an annular base member provided with a centrally depending post on the bottom adapted to extend through an opening in the floor or mounting whereby the stanchion is rotatably mounted, an upright post eccentrically arranged on the upper surfaces of the base member; a tubular upright whose lower end is adapted to receive the upstanding post of the base member and be rotatably mounted thereon; means whereby said upright may be locked against rotatable movement on said base member; a lever pivotally secured to the upper end of the upright to oscillate vertically, the pivoted end of the lever being off-set to provide a head portion disposed toward the opposite side of the pivot; and means secured to one side of the upright adjacent said lever whereby the latter may be locked in a plurality of load supporting positions.

5. A lifting stanchion of the character described comprising an annular base member provided centrally with a depending post on the bottom adapted to extend through an opening in the floor or mounting for rotatably securing the stanchion in place, while the top of the base is provided with an upstanding post arranged eccentrically on the base; an upright whose lower end is socketed to receive said upstanding post and to be rotatable thereabout; means intermediate of said upright and the base member whereby the upright may be locked against rotative movement; a rod inserted in the upper end of said upright and provided with a bifurcated end; a lifting lever pivotally secured in the bifurcations of said rod with the pivoted end of the lever off-set to provide a head portion disposed toward one side of the pivot, said lever being adapted to oscillate vertically; and means secured to the upper end of said upright adapted to limit upward swing of said lever, said means being adapted to lock the lever in a plurality of load supporting positions.

6. A lifting stanchion of the character described comprising a base member provided with a depending stem portion adapted to extend through an opening in a floor whereby the base member is rotatably mounted on a supporting floor and an upstanding eccentrically disposed stem on the upper side of the member; a cylindrical housing secured to the bottom of the floor adapted to rotatably receive the depending stem portion; an upright member socketed to receive said upstanding stem to be removably secured thereto; a fulcrum providing member secured to the upper end of said upright member; a lift lever fulcrumed at its upper end on said fulcrum providing member with the head portion of the lever extending toward one side beyond the fulcrum; and means secured to said upright member whereby the lever may be locked in its load holding position.

7. A lifting stanchion of the character described comprising an annular base member provided on the bottom with a depending cylindrical stem and on the top with a upstanding cylindrical stem eccentrically arranged and having an annular screw-end receiving surface, the depending stem being adapted to extend through a hole in the supporting floor and thereby rotatably secure the base member in place; an upright member socketed to receive said upstanding stem and to rotate thereabout, the upper end of the upright member being formed to provide a fulcrum point; a lift lever fulcrumed at its upper end on said fulcrum with the upper end of the lever off-set toward the opposite side of the fulcrum, the top of said upper end being provided with a holding surface; a latch member pivotally secured to said upper end adapted to prevent movement of the object lifted away from the holding surface; means secured to the upright member whereby the lift lever may be locked in load supporting position; a slide bolt for locking the upright member to the base against independent rotation; and means for locking the base member against rotation.

FRED A. ISAACSON.